United States Patent
Mannella (10) Patent No.: US 12,492,761 B2
(45) Date of Patent: Dec. 9, 2025

(54) COUPLED CONNECTION FOR TIGHT CLEARANCE CASING STRINGS IN OIL AND GAS WELLS

(71) Applicant: GB CONNECTIONS LLC, Houston, TX (US)

(72) Inventor: Eugene J. Mannella, Richmond, TX (US)

(73) Assignee: GB CONNECTIONS LLC, Houston, TX (US)

( * ) Notice: Subject to any disclaimer, the term of this patent is extended or adjusted under 35 U.S.C. 154(b) by 266 days.

(21) Appl. No.: 17/840,018

(22) Filed: Jun. 14, 2022

(65) Prior Publication Data

US 2023/0399898 A1    Dec. 14, 2023

(51) Int. Cl.
*F16L 15/00*    (2006.01)
*E21B 17/042*    (2006.01)

(52) U.S. Cl.
CPC .......... *F16L 15/001* (2013.01); *E21B 17/042* (2013.01); *F16L 15/002* (2013.01)

(58) Field of Classification Search
CPC ...... F16L 15/001; F16L 15/002; E21B 17/042
See application file for complete search history.

(56) References Cited

U.S. PATENT DOCUMENTS

| | | | |
|---|---|---|---|
| 1,973,848 A | 9/1934 | Duffy | |
| 3,572,777 A * | 3/1971 | Blose | E21B 17/042 285/334 |
| 4,473,245 A * | 9/1984 | Raulins | E21B 17/042 285/332.3 |
| 5,358,289 A | 10/1994 | Banker et al. | |
| 5,474,334 A * | 12/1995 | Eppink | E21B 17/042 285/333 |
| 5,794,985 A * | 8/1998 | Mallis | E21B 17/042 285/330 |
| 7,347,459 B2 | 3/2008 | Geary et al. | |
| 7,478,842 B2 * | 1/2009 | Reynolds, Jr. | F16L 15/009 285/333 |

(Continued)

OTHER PUBLICATIONS

JFE-TC, "Fox™", undated, downloaded from www.jfetc.com/product/fox/ on Jun. 14, 2022, 3 pages.

(Continued)

*Primary Examiner* — David Bochna
(74) *Attorney, Agent, or Firm* — Cabello Hall Zinda, PLLC (57) ABSTRACT

A casing string is used within a predetermined annular clearance inside a surrounding casing. Tubulars have turn-down recessed to a smaller diameter than the tubular's outer diameter. Pin ends of the tubulars have pin thread and taper inward to an even smaller diameter at the pin noses of the pin ends. Couplings have an outer diameter to fit with the annular clearance requirement. The through-bore of the coupling has box thread sections tapering outward from a center of the through-bore to the coupling's ends. The pin threads of the pipe ends thread respectively to the box thread sections of the couplings, and the pin noses of the opposing pipe ends engage in contact in the center of the coupling with a contact pressure. Cross-sections of the pin ends are balanced to cross-sections of the coupling so the connection can provide a tension and pressure ratings, such as at least 70 percent, of the pipe body tension and pressure ratings.

14 Claims, 4 Drawing Sheets

(56) References Cited

U.S. PATENT DOCUMENTS

| | | | |
|---|---|---|---|
| 8,075,023 | B2 | 12/2011 | Geary et al. |
| 8,882,157 | B2 * | 11/2014 | Chelette ............... F16L 15/001 |
| | | | 285/333 |
| 10,436,357 | B2 * | 10/2019 | Chelette ............... F16L 15/001 |
| 10,822,885 | B2 | 11/2020 | Mannella |
| 2005/0242583 | A1 | 11/2005 | Geary et al. |
| 2019/0128075 | A1 | 5/2019 | Urech |
| 2021/0301600 | A1 | 9/2021 | Michiwaki |
| 2022/0082189 | A1 * | 3/2022 | Iwamoto ............... F16L 15/001 |

OTHER PUBLICATIONS

Hunting. "Seal-Lock ® Boss (SLBOSS) Connection Technology—Threaded and Coupled." undated, downloaded from www.huntingplc.com on Jun. 14, 2022, 1 page.

Hunting. "Seal-Lock ® Flush (SLF) Connection Technology—Flush." undated, downloaded from www.huntingplc.com on Jun. 14, 2022, 1 page.

Hunting. "Seal-Lock ® XP (SLXP) Connection Technology—Integral Joint Tubing." undated, downloaded from www.huntingplc.com on Jun. 14, 2022, 1 page.

Hunting. "Seal-Lock ® SF (SLSF) Connection Technology—Semi Flush." undated, downloaded from www.huntingplc.com on Jun. 14, 2022, 1 page.

Hunting. "Tec-Lock™ BTC Connection Technology—Semi Premium." undated, downloaded from www.huntingplc.com on Jun. 14, 2022, 1 page.

Hunting. "TS-HD™ Connection Technology—Integral Joint Tubing." undated, downloaded from www.huntingplc.com on Jun. 14, 2022, 1 page.

JFE-TC. "JFEBEAR™ " undated, downloaded from www.jfetc.com/product/jfebear on Jun. 14, 2022, 3 pages.

JFE-TC. "JFELION™." undated, downloaded from www.jfetc.com/product/jfelion on Jun. 14, 2022, 3 pages.

JFE-TC. "JFETIGER™." undated, downloaded from www.jfetc.com/product/jfetiger on Jun. 14, 2022, 3 pages.

US Steel. "Threading Data: API Buttress Thread," undated, 1 page.

US Steel, "USS-CDC," Brochure, dated Apr. 2013, 6-pages.

US Steel, "USS-CDC HTQ" Brochure, dated Dec. 2012, 6-pages.

US Steel, "USS-TALON HTQ," Brochure, copyright 2020, 2-pages.

US Steel, "USS-TALON HTQ RD," Brochure, copyright 2020, 2-pages.

US Steel, "USS-FREEDOM HTQ," Brochure, copyright 2019, 2-pages.

Int'l Search Report and Written Opinion in PCT/US2025/011192, dated Mar. 7, 2025, 15-pgs.

* cited by examiner

COUPLED CONNECTION FOR TIGHT CLEARANCE CASING STRINGS IN OIL AND GAS WELLS

FIELD OF THE DISCLOSURE

The subject matter of the present disclosure relates generally to connections for threading together casing used in oil and gas well exploration and production. More particularly, it relates to couplings for joining individual lengths of casing used in wellbores.

BACKGROUND OF THE DISCLOSURE

Strings of casing tubulars commonly referred to as casing are often installed in oil and gas wells. The strings of casing tubulars telescope one inside another as they are deployed into a well. From the surface to the well bottom, a casing program starts with large diameter tubulars followed by successively smaller diameter tubulars. Individual casing strings within a well can include conductor pipe, surface casing, intermediate casing, production casing, liners, and production tubing used to case off the wellbore and provide a conduit for producing oil and gas.

Certain regulatory agencies require a minimum annular clearance between successive casing strings deployed in wells drilled within their jurisdictions. To meet these minimum annular clearances, operators typically use flush or semi-flush integral joint "premium" connections to fit in the tight clearances between the successive casing strings in a well.

Figure 1A:
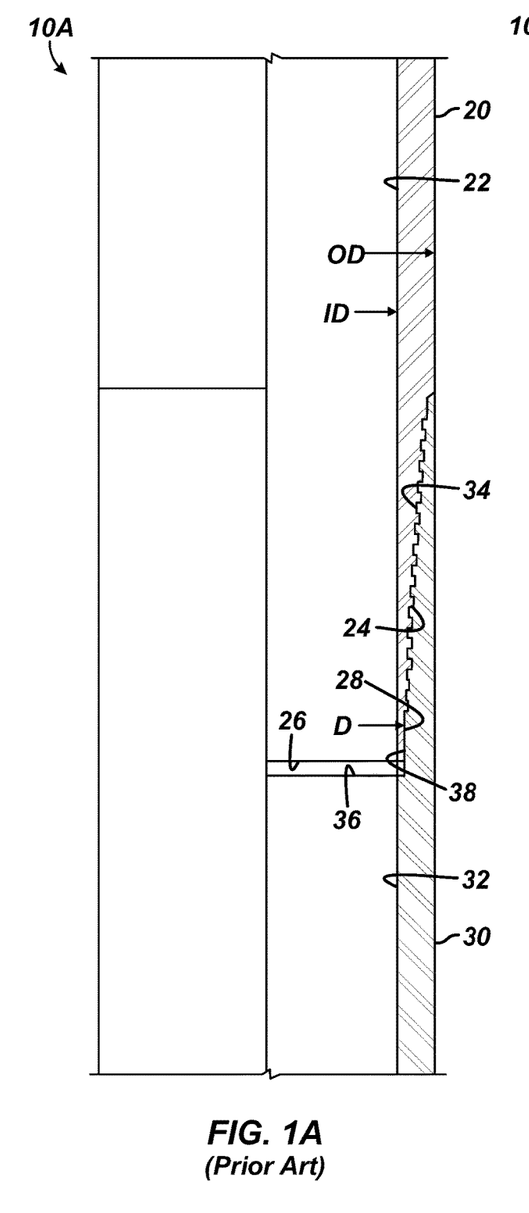
FIG. 1A illustrates a typical flush joint connection available in the art.

For example, FIG. 1A illustrates a typical flush joint connection 10A available in the art. The pipe bodies of casing tubulars 20, 30 have outside diameters OD and have bores 22, 32 with inner diameters ID. A male end 24 of one of the tubulars 20 is shown threaded to a female end 34 of the adjoining casing tubular 30. Both tubulars 20, 30 in a casing string would have male and female ends joined together to create a casing string during installation in a well. The male end 24 is threaded along a reducing diameter from the outer diameter OD to an intermediate diameter D. Likewise, the female end 34 is threaded along an increasing diameter from the intermediate diameter D to the outer diameter OD. At the end of the male end 24 is a short reduced and finely machined OD cylindrical surface 28 which is designed to radially interfere with a complimentary finely machined ID cylindrical surface 38 of the mating female end 34. The surface finishes and mating contact pressure of these surfaces 28 and 38 create a metal-to-metal seal when the connection 10A is properly assembled to effectively contain high-pressure gas. Connections with metal-to-metal seals are often referred to as "premium" connections in the industry.

As can be seen, the mating threads for the male and female ends 24, 34 are machined into the bodies of the tubulars 20, 30 so the male and female threaded ends 24, 34 each share the casing wall thickness. For this reason, the flush joint connection 10A generally has low tension efficiency relative to the pipe bodies of the adjoined tubulars 20, 30. Additionally, a distal face 26 of the male end 24, often referred to as the pin nose, may or may not engage with an inner face 36 of the female end 34. Without engagement, the connection 10A has no additional capacity for torque resistance greater than that needed to create radial interferences between the male end 24 and female end 34 and to energize the metal-to-metal seal (if present) during assembly of the connection 10A. With engagement, torque resistance increases slightly. However, the nose 26 and mating bearing areas results relatively small cross-sectional bearing areas because they each consume a portion of the shared casing wall thickness and therefore provide minimal additional torque resistance.

Figure 1B:
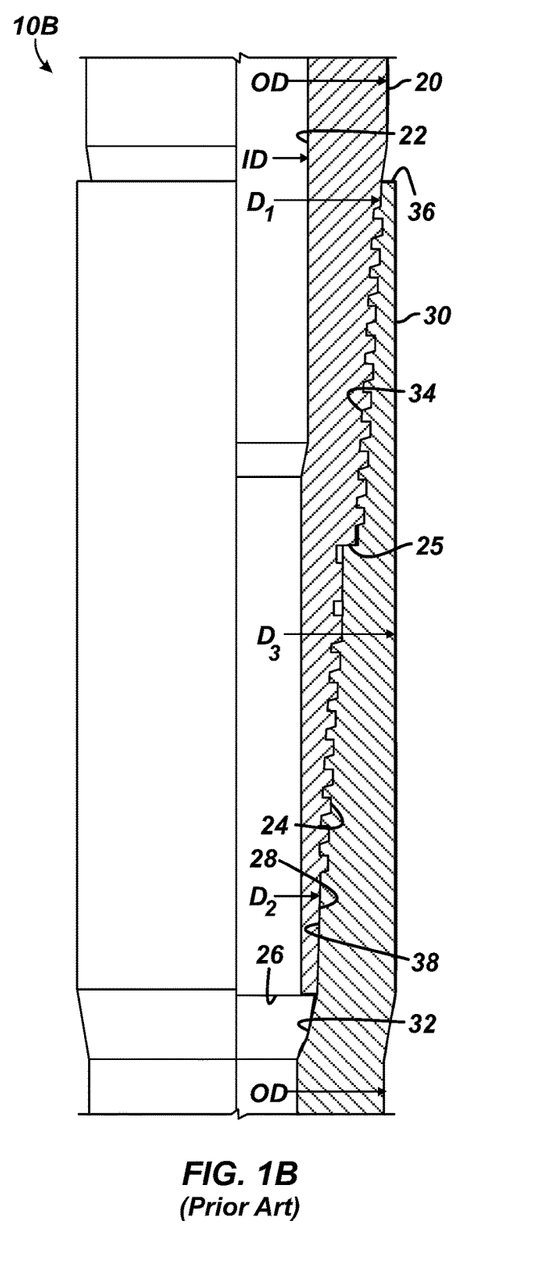
FIG. 1B illustrates a typical semi-flush joint connection available in the art.

In another example, FIG. 1B illustrates a typical semi-flush joint connection 10B available in the art. For the semi-flush connection 10B, one casing tubular 20 has a reduced pin end 24, and an adjoining casing tubular 30 has an expanded or upset box end 34, which threads to the reduced pin end 24. Both tubulars 20, 30 in a casing string would have pin and box ends joined together to create a string during installation in a well.

The pipe bodies of both casing tubulars 20, 30 generally have an outer diameter OD and have a bore 22, 32 with an inner diameter ID. The reduced pin end 24 is threaded along a reducing diameter from the outer diameter OD to an intermediate diameter $D_2$. A stepped shoulder 25 may or may not be provided at an intermediate transition. The expanded box end 34 of the other tubular 30 has an expanded or upset outer diameter $D_3$ that is greater than the outer diameter OD of the pipe body. The expanded box end 34 may or may not include a complimentary intermediate stepped shoulder depending on the p[in member configuration. The expanded box end 34 with no intermediate stepped shoulder is threaded along a constantly decreasing diameter transitioning from $D_1$ to $D_2$ to engage the reduced pin end 24 threaded along a complimentary decreasing diameter from the outer diameter OD to a diameter $D_2$. When a stepped shoulder is provided in an intermediate transition in the expanded box end 34, the end 34 is threaded along increasing diameters $D_2$ to $D_1$ to engage the stepped shoulder 25 of the pin end 24 threaded along complimentary decreasing diameters $D_1$ to $D_2$.

Expanded box 34 and reduced pin 24 share a portion of the casing wall thickness. For this reason, the semi-flush joint connection 10B generally has low tension efficiency relative to the pipe bodies of the adjoined tubulars 20, 30. The distal face 26 of the pin end 24 may or may not shoulder inside the box end 34, and the distal face 36 of the box end 34 fits outside the other casing tubular 20. At the end of the male end 24 is a short reduced and finely machined OD cylindrical surface 28 which is designed to radially interfere with a complimentary finely machined ID cylindrical surface 38 of the mating female end 34. The surface finishes and mating contact pressure of these surfaces 28 and 38 create a metal-to-metal seal when the connection is properly assembled to seal high-pressure gas. Connections with metal-to-metal seals are often referred to as premium connections in the industry.

Like the flush joint, the ends 24, 34 of the semi-flush joint 10B each consume a portion of the casing wall thickness. However, more pipe body wall is available for each tubular 20, 30 due to the expanded box and reduced pin ends 24, 34. Still, the semi-flush connection 10B has reduced tension efficiencies relative to the pipe body but typically provide greater performance than a flush joint connection 10A. Similarly, if distal face 26 of the pin end 24 engages with distal face 32 of the box, there is an increase in torque capacity. If there is an intermediate step 25, engagement torque capacity is also increased.

As is expected, these flush and semi-flush joint connections 10A-B are expensive due to manufacturing costs and limited industry availability (few designs and suppliers). In many instances, the intended service for these flush and semi-flush joint connections 10A-B do not comport well with performance needs and the price required for a given installation.

The subject matter of the present disclosure is directed to overcoming, or at least reducing the effects of, one or more of the problems set forth above.

SUMMARY OF THE DISCLOSURE

A casing assembly disclosed herein comprises tubulars and couplings. The tubulars each have a pipe body and pin ends. The pipe body has a first outer diameter and has a bore with a first inner diameter. Each of the pin ends has a turn-down recessed to a second outer diameter smaller than the first outer diameter. Each of the pin ends tapers inward from the second outer diameter at the turn-down to a third outer diameter at a pin nose of the pin end. Each of the pin ends also has a pin thread formed externally on a portion thereof.

The couplings each have a cylindrical body, which has opposing ends, a through-bore, and a third outer diameter. The through-bore has first and second portions of box thread formed internally thereon. The first portion tapers outward from a center of the through-bore to one of the opposing ends, and the second portion tapers outward from the center of the through-bore to the other of the opposing ends. The pin threads of opposing ones of the pipe ends are configured to thread respectively to the first and second portions of the box thread of the couplings. The pin noses of the opposing pipe ends are configured to meet in the center of the couplings. The pin noses have a nose bearing area configured to engage with a torque resistance against one another.

Critical cross-sections of the pipe body, the turn-down, and the pin end are generally balanced to critical cross-sections of the coupling. The balanced critical cross-sections are configured to achieve targeted connection tension and pressure efficiencies relative to the pipe body. For example, the critical cross-sections can be configured to maximize the nose-bearing area of the pin noses. The pipe body can have a first tension and pressure rating, and a connection at the coupling and the pipe ends can have a second tension and pressure rating that is at least 70 percent of the first tension and pressure rating.

A casing string disclosed herein is for use inside a surrounding casing. The casing string comprises tubulars and couplings. Each of the tubulars has a pipe body and pin ends. The pipe body has a first outer diameter and has a bore with a first inner diameter. Each of the pin ends has a turn-down recessed to a second outer diameter smaller than the first outer diameter. Each of the pin ends tapers inward from the second outer diameter at the turn-down to a third outer diameter at a pin nose of the pin end. Each of the pin ends has a pin thread formed externally on a portion thereof.

Each of the couplings has a cylindrical body having opposing ends, a through-bore, and a third outer diameter. The third outside diameter is greater than the first outside diameter of the pipe body and is configured with a predetermined annular clearance to the surrounding casing. The through-bore has first and second portions of box thread formed internally thereon. The first portion tapers outward from a center of the through-bore to one of the opposing ends, and the second portion tapers outward from the center of the through-bore to the other of the opposing ends. The pin threads of opposing ones of the pipe ends are configured to thread respectively to the first and second portions of the box thread of the couplings, and the pin noses of the opposing pipe ends are configured to meet in the center of the couplings and are configured to engage with a contact pressure against one another.

Again, cross-sections of the pin end can be balanced to cross-sections of the coupling. The balanced cross-sections can be configured to provide minimum tension and pressure ratings for a connection at the coupling and the pipe ends. The tension and pressure rating of the connection at the coupling and the pipe ends can be at least percent tension and pressure rating of the pipe body.

A method of manufacturing a casing assembly with tubulars and a coupling is disclosed herein for use with a predetermined annular clearance inside a surrounding casing string. The method comprises: selecting a first outside diameter and a weight of a pipe body for the tubulars; selecting a second outside diameter of the coupling to fit within the predetermined annular clearance; and configuring a connection at box ends of the coupling to pin ends of the tubulars to meet a rating for tension and/or pressure by: forming turn-downs in the first outside diameter of the pipe body at the pipe ends of the tubulars, the turn-downs recessed to a third outer diameter smaller than the first outer diameter; configuring pin thread of opposing ones of the pipe ends to thread respectively to box thread in the box ends of the coupling; and configuring nose bearing area of pin noses on the opposing pipe ends to contact with one another in a center of the throughbore of the coupling; and balancing critical cross-sections of the pipe ends to critical cross-sections of the coupling.

To configure the pin thread to mate to the box thread and to configure the pin noses to contact, the pin thread can be formed externally on the pipe ends tapering inward from the third outer diameter at the turn-downs to a fourth outer diameter at the pin noses of the pipe ends, and first and second sections of the box thread can be formed internally on the through-bore of the coupling and tapering from a center of the through-bore to opposing ends of the coupling.

To configure the pin thread to thread to the box thread, interference fit threads can be formed and configured for tension and pressure resistance. Balancing the critical cross-sections of the pipe ends to the critical cross-sections of the coupling can involve balancing the critical cross-section of the pipe ends at one point of the connection to the critical cross-section of the coupling at another point of the connection. To configure the connection to meet the rating for both tension and pressure, the tension and pressure rating of the connection can be configured to be at least 70 percent of a tension and pressure rating of the pipe body of the tubulars.

The foregoing summary is not intended to summarize each potential embodiment or every aspect of the present disclosure.

DETAILED DESCRIPTION OF THE DISCLOSURE

Figure 2:
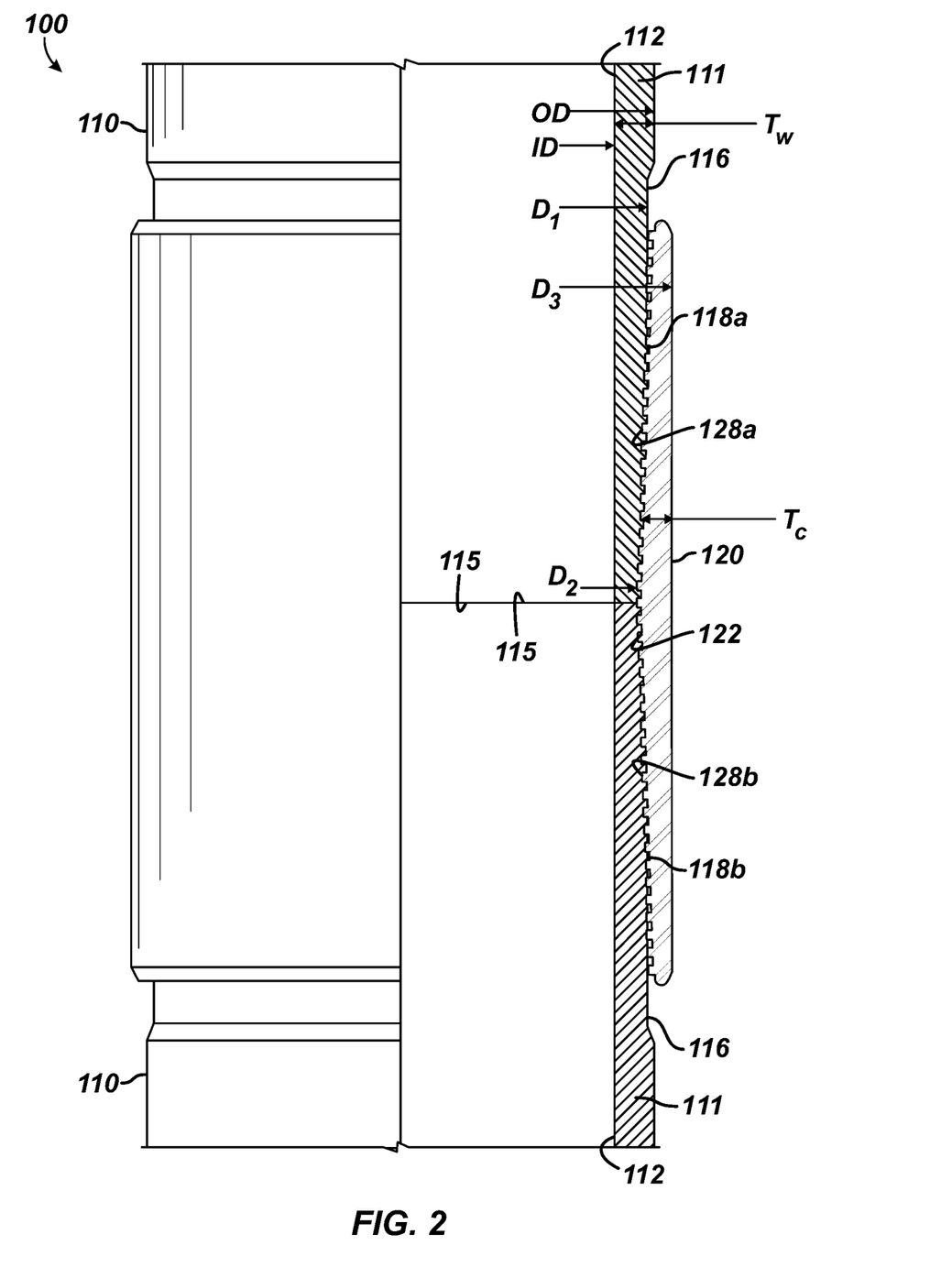
FIG. 2 illustrates a slim hole coupled connection according to the present disclosure.

FIG. 2 illustrates a slim hole coupled connection 100 for connecting casing tubulars 110 together according to the present disclosure. As noted in the Background with respect to FIGS. 1A-1B, operators use flush and semi-flush integral connections for tight clearance situations between successive casing strings in a well. The slim hole coupled connection 100 disclosed herein is used for tight clearance situations between successive casing strings in a well. In contrast to the typical connections, however, the slim hole coupled connection 100 of the present disclosure uses a coupling 120 to connect the pin ends 118a-b of adjoining casing tubulars 110.

The casing tubulars 110 have pipe bodies 111 with an internal bore 112. The pipe bodies 111 generally have an outside diameter OD and an inside diameter ID that define a wall thickness $T_w$ of the casing tubulars 110. As is customary, the casing tubular 110 for the subject applications usually has standard sizes for downhole use with the outside diameters OD ranging from 4½ in. to 13⅝ in. Moreover, the casing tubular 110 usually has a particular weight (lbs/ft) defined by the wall thickness $T_w$ suited to the implementation and its requirements. Some example casing sizes include 5½ in. and 7⅝ in. The weight for 5½ in. casing can range from 11.5 to 43.10 lbs/ft, whereas the weight for 7⅝ in. casing can range from 24.0 to 55.30 lbs/ft. The particular characteristics of casing are defined by American Petroleum Institute (API) casing specifications.

Figure 3:
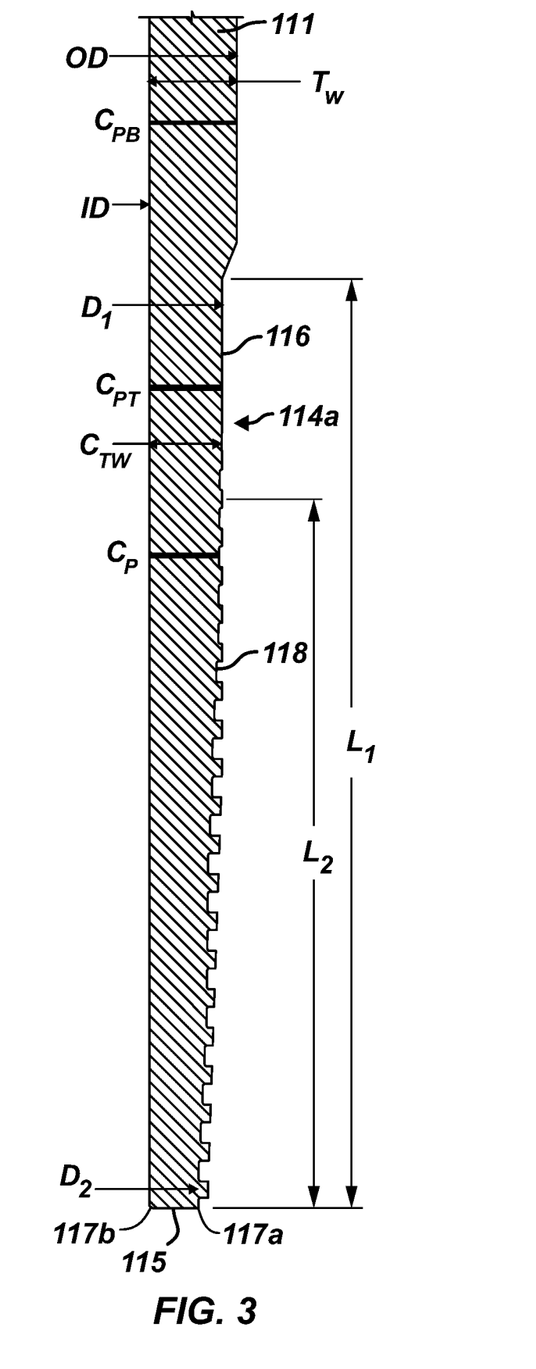
FIG. 3 illustrates a schematic view of a reduced pin end of the disclosed slim hole coupled connection.

The pin ends 114a-b (having thread 118a-b) have a turned-down 116 that is machined into the outer wall of the casing tubular's pipe body 111. As also shown in the detail of FIG. 3, the cylindrical turn-down 116 has a reduced diameter $D_1$ less than the standard outside diameter OD of the casing tubular 110. The turned-down 116 has a constant diameter initially machined along the entire length $L_1$ of the pin end 114. Pin end 114 (having thread 118) is then threaded to a smaller diameter $D_2$ at the nose 115 with an increasing constant taper to diameter 116. Pin thread 118 is a run out thread machined to an extent $L_2$ that lies only partially along the turn-down 116 to the nose 115 of the pin end 114a-b.

Figure 4:
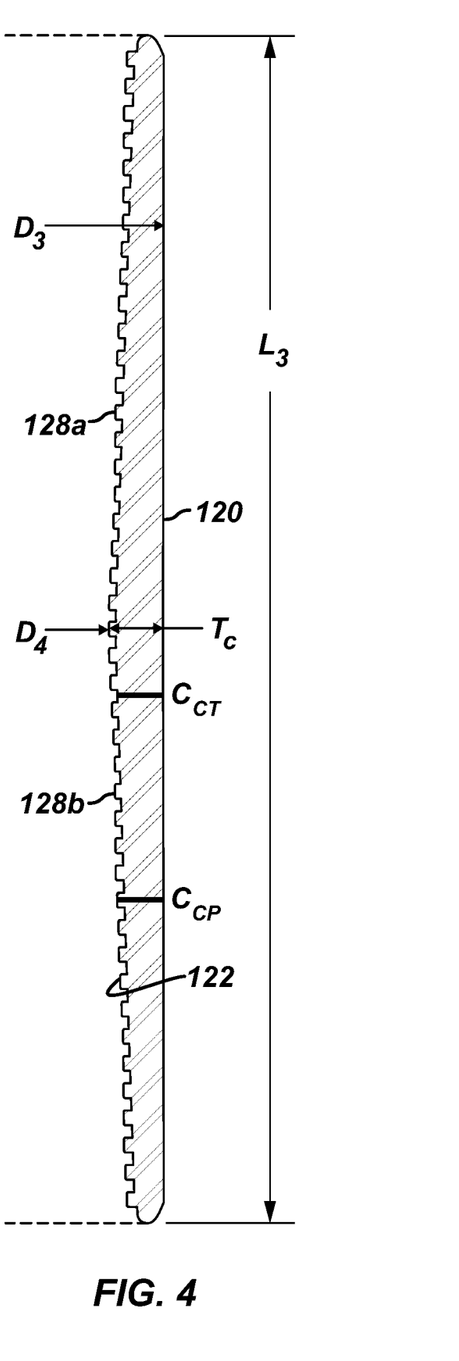
FIG. 4 illustrates a schematic view of a coupling of the disclosed slim hole coupled connection.

The coupling 120 is a cylindrical body having an outer diameter $D_3$ and an inner bore 122. As also shown in the detail of FIG. 4, the coupling 120 has a wall thickness $T_C$ defined by the outer diameter $D_3$ and an inner diameter $D_4$ of the coupling's inner bore 122. The inner bore 122 is threaded with a tapered box thread 128a-b to connect to complimentary tapered pin threads 118a-b on the turned-down pin ends 114a-b of the adjoining casing tubulars 110. The box thread 128a-b has opposing box thread sections along the length L3 of the coupling 120. In particular, one box thread section 128a tapers outward from a center of the coupling's bore 122 to one of the opposing ends, and the other box thread section 128b tapers outward from the center of the coupling's bore 122 to the other of the opposing ends. Thus, the wall thickness $T_C$ of the coupling 120 constantly varies toward both ends of the coupling 120.

Figure 5:
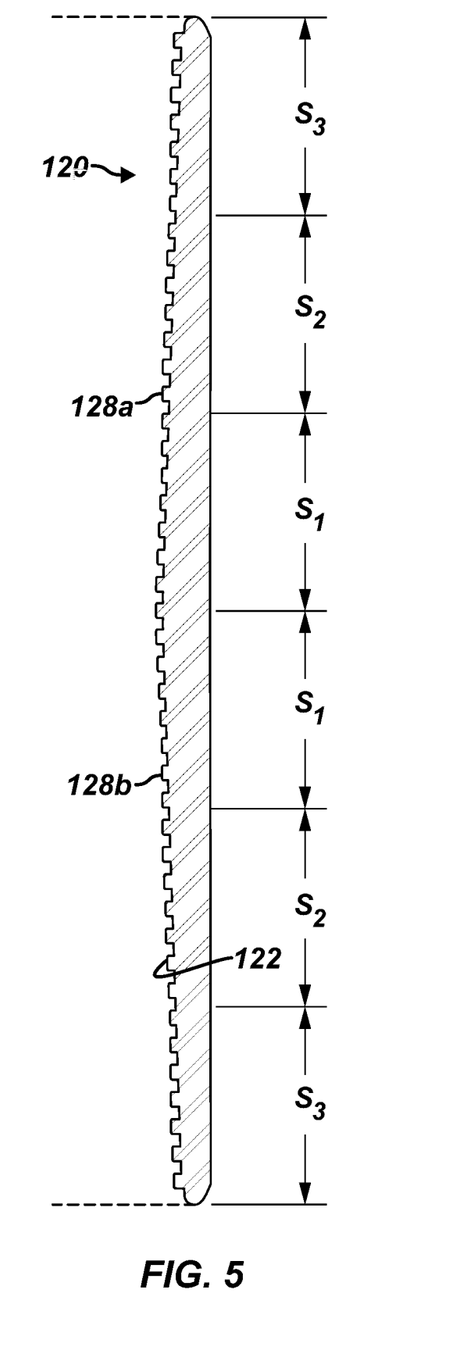
FIG. 5 illustrates a schematic view of another coupling of the disclosed slim hole coupled connection having multiple taper sections for the thread.

In one arrangement, the threads 128a-b of the coupling 120 can each have a single taper. Alternatively, the threads 128a-b of the coupling 120 can have multiple taper sections, such as disclosed in U.S. Pat. Nos. 7,347,459 and 8,075,023, which are incorporated herein by reference. For example, FIG. 5 illustrates a schematic view of another coupling 120 of the disclosed slim hole coupled connection.

This coupling 120 can be similar to those disclosed previously, but the coupling 120 further includes multiple taper sections $S_1$, $S_2$, $S_3$ for the thread 128a-b. Three sections are simply shown as an example, and more or fewer sections can be used. Overall, the multiple taper sections $S_1$, $S_2$, $S_3$ may or may not be necessary, but they can provide advantages. For example, the multiple taper sections $S_1$, $S_2$, $S_3$ can reduce contact pressure in areas of the connection 100 and can provide better resistance to long-term, low-level fatigue loading that occurs while rotating casing.

As shown in FIG. 2, the pin threads 118a-b thread respectively in the box threads 128a-b at the ends of the coupling 120 to make up the slim hole connection 100. The bearing surfaces on the noses 115 of the pin ends 114a-b engage with one another inside the coupling 120. FIG. 2 illustrates the connection 100 made-up under full power-tight assembly. With power-tight assembly, the bearing faces on the noses 115 of the pin ends 118a-b meet in the center of the coupling 120 and develop high contact pressure at the mating interface.

Preferably, compressive forces at the mating noses 115 are carefully controlled during connection assembly. Torque resistance of the connection 100 is a function of the contact area of the bearing faces on the noses 115 of the pins 118a-b and their material strength. The torque resistance can allow the casing string to be rotated to aid casing string advancement. For this reason, the cross-sectional area of the bearing faces on the noses 115 are preferably maximized within the geometric constraints defined by the casing wall thickness $T_w$, the taper of the pin thread 118a-b, the reduced diameter $D_2$ of the turn-down 116, the outside chamfer 117a on the pin nose 115, and the corner break 117b on the inside of the pin nose 115 and the threadform (118 a-b) height, lead, and taper characteristics.

Considering the cross-sectional area to maximize torque resistance noted above, the discussion now turns to various constraints and variables to make the slim hole connection 100 suited for a particular implementation. As expected, the coupling 120 has an outer diameter $D_3$ that can be selected to meet regulatory clearance requirements. For example, the outer diameter $D_3$ can be greater than the tubular's outer diameter OD by a predetermined amount that would allow the connection 100 to maintain a required annular clearance with a surrounding casing wall in which the connection 100 is deployed. In fact, the outside diameter $D_3$ of this coupled connection 100 can be similar to the profile for a semi-flush, integral joint connection (10B: FIG. 1B) and can accomplish the same clearance objectives. Thus, the actual outer diameter $D_3$ of the coupling 120 is usually a set constraint for the implementation to meet minimum regulatory annular clearance requirements.

A. Maximizing for Pressure and Tension Efficiencies

According to one embodiment, the connection 100 of the present disclosure is configured so that it is optimized for both pressure and tension efficiencies (with the torque resistance added). To do this, the coupled connection 100 of the present disclosure is designed so that critical cross-sections of the pipe 110 are generally balanced to the critical cross-sections of the coupling 120. As shown in FIGS. 2 and 3, the pipe 110 has an outside diameter cylinder turn-down 116, which is formed on the pipe body 111 prior to machining the pin thread 118 on the pin end 114.

In FIG. 3, the pipe 110 is schematically shown with critical cross-sections. The critical cross-section for the pipe body 111 is depicted as $C_{PB}$; the critical cross-section for the cylinder turndown 116 is depicted as $C_{PT}$; and the critical cross-section for the pin is depicted as $C_P$. In FIG. 4, the coupling 120 is schematically shown with critical cross-sections. The critical cross-section for the coupling tension is depicted as $C_{CT}$; and the critical cross-section for the coupling pressure is depicted as $C_{CP}$.

As noted herein, this connection 100 uses the coupling 120 for extreme clearance situations. The OD turn-down 116 of the pipe 110 and the threading on the pipe end 114 are married to complementary features of the coupling 120 in a design process that balances all of the geometric features to yield one or more targeted connection efficiencies, such as yield strength, pressure, tension, and/or torque resistance. Notably, the critical cross-sections that are balanced to produce the targeted connection efficiencies for tension and pressure in each member define four specific and different locations. Further discussion of these critical cross-sections is described below.

Looking generally at balancing the critical cross-sections to maximize the pressure and tension efficiencies of the connection 100, it is understood that the pin threads 118a-b on the tubulars' pin ends 114a-b screw into the mating female box threads 128a-b of the coupling 120 to form the slim hole connection 100. Given that the outside diameter $D_3$ for the coupling 120 is a set constraint dictated by the allowable annular clearance for the implementation, the mating cross-sections $C_{CT}$, $C_{CP}$ of the connection 100 are configured/balanced to produce a connection 100 that meets a certain set of performance requirements, such as tension, and pressure requirements. In other words, because both the outside diameter OD of the casing 110 and the connection's outside diameter (i.e., the coupling's outside diameter $D_3$) are defined by the casing string geometry, the slim hole connection 100 is configured to generally balance the relative critical cross-sections $C_{CP}$, $C_{PT}$ of the coupling 120 and the pin ends 114a-b to (a) achieve a generally balanced strength relative to one another, and (b) meet an efficiency target with respect to the pipe body tension and pressure resistances.

Looking with more particularity at balancing the critical cross-sections, several factors are involved in configuring the slim hole connection 100 as the relative strength of the connected features must be calculated and considered. The connected features under consideration include the pipe body 111, the cylinder turn 116, the threaded pins 114a-b, and the coupling 120. Each of these features is rated for tension and pressure resistance. In addition, each of these features has a critical cross-section that defines its individual tension and pressure resistance. Moreover, the location of the critical cross-sections in the pin end 114a-b and the coupling 120 are different for tension and pressure resistance. In the design of the slim hole connections 100, a series of properties are determined for each of these features of the slim hole connection 100 comprised of the pipe body 111, the turn down 116, the threaded pins 114a-b, and the coupling 120. A series of iterative calculations involving multiple strength equations can be used to yield the relative four critical cross-sections of these features to achieve a target connection efficiency relative to the performance properties of the pipe body 111.

Industry-standard equations defined by API can calculate the individual uni-axial performance properties of each of the features at the prescribed locations of the critical cross-sections. The API equations are approximations only as they are derived for similar connection geometry. However, the modifications proposed herein for the connection 100 are sufficiently different for some properties that the API equations may be overly conservative.

For this reason, more rigorous analytical methods, such as Finite Element Analysis, can also be used to evaluate connection performance in terms of stresses and strains when multiple loads are applied in combination. These rigorous analytical methods can more closely simulate the real-world conditions by considering various possible applied load combinations when casing and connections are deployed and throughout the intended service life of a well. Considering the noted critical cross-sections for the features and using the computational analysis, the design of the present disclosure seeks to achieve a balance among the various relative cross-sections ($C_{PB}$ for the pipe body 111, $C_{PT}$ for the cylinder turndown 116, $C_P$ for the pin ends 114a-b, $C_{CT}$ for the coupling tension, and $C_{CP}$ for the coupling pressure) to achieve target efficiencies of the coupled connection 100 relative to the pipe body 111.

Torque resistance is another important feature of the subject design because operators often have to rotate the casing to break the downhole skin friction of the casing string to help advance the casing string to the target depth when deploying the string in the well. Torque is achieved by maximizing the bearing areas on the pin noses 115 of the pin ends 114a-b. This is necessarily constrained by the wall thickness of the pipe body 111, the diameter $D_1$ of the cylinder turndown 116, and the threadform height geometry and taper of the threads 118a-b on the pipe ends 114a-b, which ultimately define the dimensions for the bearing face on the pin nose 115. Torque resistance is determined by the area of the threadform load flanks of the thread 118a-b that drive the pin noses 115 together in the connection 110. While torque is not an industry-specified performance property, most operators are vitally interested in the torque capabilities of casing connections because high torque resistance provides valuable utility in low clearance casing strings and well construction where deploying casing to target can be challenging. In some instances, the ability to apply torque to rotate the casing can make the difference between completing a well or having to abandon efforts due to stuck pipe or a lost-hole situation at a potential cost in the millions of dollars. The prior art connections in FIGS. 1A-1B do not have significant torque resistance, and therefore they cannot be rotated if needed to achieve a target depth.

As is usual, parameters of the casing tubular 110, such as the casing outer diameter OD, casing weight, wall thickness $T_w$, yield strength, ultimate strength, modulus of elasticity, and the like, are designed for the particular implementation for which the casing tubular 110 is to be used. Project-specific well requirements ultimately indicate the diameter, wall thickness, and strength of the casing tubular 110 needed for any given well.

Other parameters of the connection 100 are defined by the geometry of the implementation. Again, the coupling's outside diameter $D_3$ is defined by the required annular clearance for the casing tubular's size being used inside a surrounding casing. In general, the nominal wall thickness $T_c$ of the coupling 120 is a function of the annular clearance requirements, targeted performance properties, and diameter $D_1$ of the turn down 116 required for the application. It may be possible that a configuration of the present disclosure may not be able to achieve a target performance property due to the limitations of the casing wall thickness $T_w$. In these instances, the only option for the operator may be to use a flush connection (which will also likely be insufficient)

or a semi-flush premium connection as default and to abandon any additional utility offered by a connection that can be rotated.

The thread forms used for the pin and box threads 118, 128 can comport with industry-standard thread forms as to thread taper, thread height, API Buttress Connection (BC) perfect thread length, thread pitch, and the like. Proprietary thread designs can also be used for the pin and box threads 118, 128 but this would require threadform specific equations for design optimization. The use of industry-standard threads allows for easier and lower-cost access to accessories needed for field deployment. The pin and box threads 118a-b, 128a-b preferably use an interference fit thread designed for tension and pressure resistance. Such thread interference fit connections are often referred to as "semi-premium" connections, which are commonly used for challenging as opposed to the most critical well applications.

Ultimately, given these constraints, the connection 100 is designed to meet a desired set of strength ratings. For example, the connection 100 preferably has desirable tension efficiency compared to the pipe body 111 of the tubular 110. An example of a typical target efficiency is 70%, but a higher or even lower efficiency may be acceptable depending on the well-specific application. In other words, the minimum yield for the connection 100 at the cylinder turn down 116's diameter $D_1$, at the pin threads 114a-b, and at the coupling 120 can be designed to be at least 70% of the minimum yield of the pipe body 111 of the casing tubular 110. It is also usually desirable for the connection 100 pressure efficiency to be at least 70% of pipe body 111. Other values for the strength rating can be used depending on the requirements of a given implementation.

Taking into consideration all the above constraints for the casing 110 and coupling 120, features of the connection 100 are calculated so the desired strength ratings or connection efficiencies can be achieved. These features include values for the turn-down diameter $D_1$, the taper of the pin end 114a-b from the turn-down diameter D1 to the end diameter $D_2$, and the cross-sectional area of the pin nose 115. These variables define the critical cross-section $C_{PT}$ for the turn-down 116 and the critical cross-section $C_P$ for the pin end 114. Further, the outside diameter $D_3$ of the coupling 120 is defined by the regulatory clearance requirements taking into account the outer string or open hole wellbore ID and the inner string OD. The balancing of critical cross-sections determines the critical tension cross-section $C_{CT}$ and the critical pressure cross-section $C_{CP}$ of the coupling 120.

Values for these features provide calculations for the critical thickness at the turn-down 116, the bearing area of the nominal pin nose 115 of the pin end 114 after the turn-down 116, a nominal force that yields the pin nose 115, yield torque after the turn-down 116, pipe thread strength after the turn-down 116, minimum internal pressure rating for the pin end 114 after the turn-down 115, and the like.

As an example, a casing tubular 110 having an outer diameter OD of 5½ in., a weight of 20 lbs/ft, and a wall thickness $T_w$ of 0.361 in. can be used with a coupling 120 having an outside diameter $D_3$ of 5.900 in. to meet the annular space requirements. The features are designed with the nominal turn-down diameter $D_1$ of 5.375 in., the cross-sectional area $C_p$ of pipe end 114 after the turn-down 116 is 5.398 int, and other calculated values. The pipe body 111 in this example with a minimum yield strength of 125,000 psi would have a plain end tension rating of 728.5 kips. The present connection 100 machined from the same material with the minimum yield strength of 125,000 psi would then be designed to produce a minimum coupling tension rating of 607.3 kips (i.e., at least 80% of the pipe body's tension rating although other percentage values could be targeted).

Oilfield operators need connections with high torque ratings for rotating casing to assist target achievement in long lateral wells. The connection 100 disclosed herein provides this attractive utility through engagement between opposing pin noses 115 on the casing tubulars 110 by maximizing the nose bearing area on the pin noses 115 to provide torque resistance. The connection 100 of the present disclosure can be produced at a lower cost than flush or semi-flush connections, and the field deployment can also be easier.

In general, there may be standard designs for the connections 100 disclosed herein, but there will only be one standard design for each casing OD and wall thickness. In one standard design, the connection 100 is optimized to meet about 70 to 80% tension and pressure efficiency of a base pipe body while providing a maximum torque resistance. In these cases, torque will be maximized given constraints on the available area for the pin nose 115.

However, the desired efficiency of the connection 100 can vary based on the application. In some cases, the tension efficiency of the connection 100 may be the desired factor. In other cases, the efficiencies for pressure resistance or torque for the connection may be the desired factor. Accordingly, the connection 100 may comprise several variations for a single size, weight, and grade of casing to suit different applications. Overall, there are a number of variables so achieving the desired connection 100 requires multiple iterations depending on what target efficiencies are desired.

B. Maximizing for Pressure Efficiency

The discussion provided above focused on configuring the connection 100 so that it optimizes for both pressure and tension efficiencies (with the torque resistance added). A connection 100 can be configured according to the present disclosure to maximize mainly the pressure efficiency of the connection 100. The critical pressure rating that defines the efficiency of the connection 100 is the lower of the pressure rating for the cylinder turn 116, the minimum internal pressure for the coupling 120, and the connection leak resistance. Values for each of these may be defined by API formulas.

To maximize the connection 100 mainly for pressure efficiency, for example, the coupling 120 can be designed so that the critical coupling cross-section $C_{CP}$ is as large as possible relative to the pipe body cross-section $C_{PB}$. Pressure is a function of the pipe body cross-section $C_{PB}$, the turndown cross-section $C_{PT}$, and the critical coupling cross-section $C_{CP}$. Accordingly, the design objective is to balance these cross-sections ($C_{PT}$ and $C_{CP}$) within the constraints of: (i) the pipe body wall thickness $T_W$ and (ii) the limiting coupling OD defined by regulations. Other methods can be used to meet the target requirements that might include changing the thread taper, height, and length.

C. Maximizing for Tension Efficiency

The discussion provided above focused on configuring the connection 100 so that it optimizes for both pressure and tension efficiencies or it maximizes mainly for the pressure efficiency of the connection 100. A connection 100 can be configured according to the present disclosure to maximize mainly the tension efficiency of the connection 100. In general, the critical tension rating that defines the connection's tension efficiency is the lower of: the tension rating for the cylinder turn-down 116, the pipe thread strength, and the minimum coupling tension. Values for each of these may be defined by API formulas.

There are several options to maximize the connection 100 mainly for tension efficiency, for example, that ultimately lead to maximizing the ratio of cross-sectional areas $C_{CT}$ to $C_{PB}$. One method can increase the cylinder turn diameter D1 to provide a larger critical cross-section $C_{CT}$ in the coupling 120. However, given the constraints for the OD of the coupling 120 and the wall thickness $T_W$ for the pipe body, other design techniques such as changing the thread taper, thread height, or overall length may be required to meet the target performance requirements of connection 100.

D. Details of Turndown Geometry

Although the turndown 116 helps the connection 100 fit within a particular clearance requirement as noted, the features of the turndown 116 (e.g., its geometry, diameter, taper, placement on pipe end, etc.) are designed in an iterative process based on several considerations to achieve the targeted efficiencies noted herein.

In particular, a length of the turndown 116 can be configured to avoid allowing extra thread interference from occurring, which can cause corresponding high hoop stresses in the coupling 120 at the ends. The transition from the cylinder turn diameter $D_1$ out to the pipe body's OD should be at a shallow angle with a fillet transition. An internal fillet avoids creating a stress riser at the corner that could be detrimental to downhole performance of the connection 100 under anticipate service load conditions.

Preferably, the starting thread 128a-b in the coupling 120 does not radially interfere in any way with the transition from the cylinder turndown's diameter $D_1$ to the pipe body's OD. Because the wall thickness $T_W$ of the pipe body (111) is greater than the wall thickness $C_{TW}$ after cylinder turndown 116, the thicker part is stronger. Thus, it is preferred that the transition occurs a sufficient distance away from the ends of the coupling 120 after power tight assembly to avoid imparting additional hoop stresses in the coupling 120 that could detract from downhole performance under service loading conditions.

E. Details of Mating Threads

Figure 6:
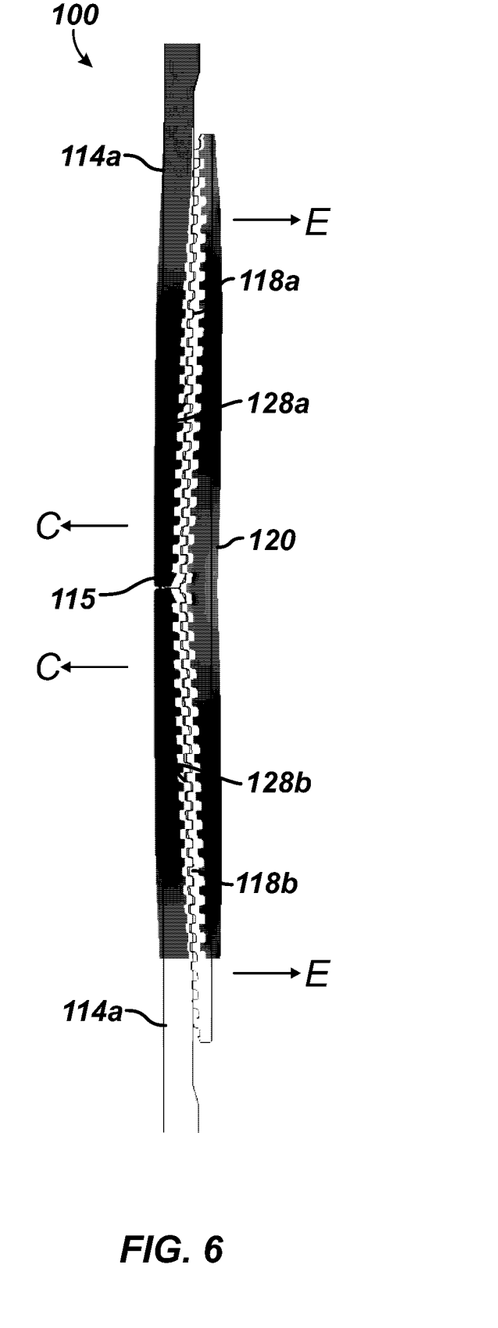
FIG. 6 illustrates the connection schematically showing stresses and displacements due to the use of high radial interference mating threads.

Discussion now turns to details of the mating threads 118a-b, 128a-b, as referenced in FIG. 6. The pin ends 114a-b and the coupling 120 preferably use high radial interference mating threads 118a-b, 128a-b. During assembly, the box ends of the coupling 120 are forced to radially expand outward (E). At the same time, the pin ends 114a-b are forced to compress radially inward (C). The assembly is synonymous with forcing a large external conical member into a smaller internal conical member. The amount of outward box expansion (E) of the coupling 120 and inward pin compression (C) of the pin ends 114a-b for each member is relative to their individual cross-sectional areas, i.e., their relative strengths.

Given that both members 114a-b, 120 are tapered, the cross-sections constantly vary such that the thinnest portion of the pin end 114a-b (i.e., the nose 115) ends up adjacent to the thickest part of the coupling 120 at its midpoint. Conversely, the thickest part of the pin ends 114a-b ends up adjacent to the thinnest part of the coupling 120. The resulting stresses form a 3-dimensionsal effect that includes (1) radial expansion/contraction of the two parts combined with (2) shortening of the coupling 120 as the coupling 120 expands outward (E), and (3) lengthening the pin ends 114a-b as the pin ends 114a-b are compressed inward (C). There is also axial bending of the members 114a-b, 120. To illustrate the effect, hoop stresses and displacements are schematically shown in FIG. 6 for the connection 100 after assembly. The scale of the displacements is exaggerated to highlight the changes. As expected, the relative displacements of the members 114a-b, 120 cause strain and therefore stress.

Large hoop stress in couplings or box members that are made of susceptible materials and are placed in unsuitable environments can cause a common industry problem referred to as "environmentally-assisted cracking". In certain environments, for example, high-stress areas of the members create pockets for free hydrogen to reside. As free hydrogen increases and crowds into the interstitial spaces (i.e., the fabric of the steel), cracks develop causing failure of the box member. These failures occur catastrophically and without notice. They also occur randomly within various strings of adjacent wells. The phenomenon is referred to as "environmentally-assisted cracking" because in many cases the source of the free hydrogen cannot be determined and can develop quickly or over some time before failure occurs. The typical mode of failure is hydrogen or corrosion-related embrittlement.

According to the present disclosure, the high radial interference mating threads 118a-b, 128a-b and the mating cross-sectional areas of the members 114a-b, 120 are modeled to determine the stress levels and displacements that can develop during assembly of the connection 100. In this way, the disclosed techniques for balancing the mating cross-sections described herein to optimize the connection 100 for pressure and/or tension efficiencies can also be configured to yield low hoop stresses at the connection 100. Attention to yielding the low hoop stress levels can be performed to reduce the risk of "environmentally-assisted cracking" when the casing is to be made of susceptible materials to meet required performance properties. Additionally, configuring the connection 100 to have low hoop stress levels after assembly can leave more residual strength to resist anticipated downhole load conditions that are additive to the made-up stress states of the connection 100.

F. Details of Pin Nose Geometry

Although the pin noses 115 of the connection 100 engage with one another and create torque resistance, the features of the pin nose 115 (e.g., geometry, chamfer, corner break, thread root clearance, etc.) are designed to have several beneficial characteristics.

Several factors impact the final geometry of the bearing face on the pin nose 115. In particular, threadform characteristics, such as thread height, taper, and length, can have an impact on the final geometry. The wall thickness $T_W$ of the pipe body 111 also constrains the area available for the bearing face on the pin nose 115. The pin nose 115 also has an OD chamfer 117a, which can aid in stabbing the pin member into the box member of the connection 100.

When considering the threadform 118, the thread's root ideally exits on the chamfer 117a of the pin nose 115 and not at the bearing face of the pin nose 115. Otherwise, the threadform 118 would reduce the bearing area of the pin nose 115 and could compromise the torque resistance of the connection 100.

Lastly, an ID chamfer can be provided on the pin nose 115 as is customary to eliminate a sharp corner that could cause injury to a careless worker. In the industry, there are no standardized specifications for such an ID chamfer. Most manufacturers prefer to create this ID chamfer during threading for efficiency and corresponding low cost. Given all of the variables associated with casings produced by mills around the world, machine programmers typically create an aggressive diameter for an ID chamfer that is assured to eliminate the aforementioned sharp corner. However, this practice significantly reduces the bearing area of the pin nose 115 and therefore can reduce the torque capacity of the connection 110.

In the present configuration, the pin nose 115 is preferably treated with an ID corner break 117b instead of an ID chamfer. This ID corner break 117b is effectively a minimal chamfer that mitigates the issue of sharp corner safety, but maximizes the bearing area for the pin nose 115 for added torque capacity. In most cases, this ID corner break 117b can be produced in a manual process to avoid reducing the bearing face of the pin nose 115.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A casing assembly, comprising:
    tubulars each having a pipe body and pin ends, the pipe body having a first outer diameter and having a bore with a first inner diameter, the pipe body having a first critical cross-section defined by the first outer diameter and the first inner diameter, a first strength of the pipe body being defined by the first critical cross-section, the pipe body having a pipe tension resistance and a pipe pressure resistance defined by the first strength, each of the pin ends having a turn-down recessed to a second outer diameter smaller than the first outer diameter, the turn-down having a second critical cross-section defined by the second outer diameter and the first inner diameter, a second strength of the turn-down being defined by the second critical cross-section, each of the pin ends tapering inward from the second outer diameter at the turn-down to a third outer diameter at a pin nose of the pin end, the pin end having a third critical cross-section defined by the third outer diameter and the first inner diameter, a third strength of the pin end being defined by the third critical cross-section, each of the pin ends having a pin thread formed externally on a portion thereof; and
    couplings each having a cylindrical body, the cylindrical body having opposing ends and having a through-bore, the cylindrical body having a fourth outer diameter, the through-bore having a second inner diameter, the through-bore having first and second portions of box thread formed internally thereon, the second inner diameter at the first portion tapering outward from a center of the through-bore to one of the opposing ends, the second inner diameter at the second portion tapering outward from the center of the through-bore to the other of the opposing ends, the couplings each having at least one fourth critical cross-section defined by the fourth outer diameter and the second inner diameter, a fourth strength of the coupling being defined by the at least one fourth critical cross-section,
    the pin threads of opposing ones of the pin ends being configured to thread respectively in a connection to a respective one of the first and second portions of the box thread of the couplings,
    the pin noses of the opposing ones of the pin ends being configured to meet in the connection in the center of the couplings, the pin noses having a nose bearing area configured to engage with a torque resistance against one another,
    wherein (a) at least the second critical cross-section of the turn-down is selected to increase the at least one fourth critical cross-section of the coupling relative to the first critical cross-section of the pipe body and (b) at least the third strength of the pin end defined by the third critical cross-section is iteratively selected relative to the fourth strength of the coupling defined by the at least one fourth critical cross-section of the coupling to achieve: a connection tension resistance for the connection at a first targeted level that is at least 70 percent of the pipe tension resistance of the pipe body, and a connection pressure resistance for the connection at a second targeted level that is a least 70 percent of the pipe pressure resistance of the pipe body.

2. The casing assembly of claim 1, wherein the fourth outer diameter of the couplings is greater than the first outer diameter of the pipe body.

3. The casing assembly of claim 1, wherein the first and second critical cross-sections are configured to maximize the nose bearing area of the pin noses.

4. The casing assembly of claim 1, wherein the pin thread and the box thread comprise interference fit thread being configured for the connection tension resistance and the connection pressure resistance.

5. The casing assembly of claim 1, wherein to maximize the connection pressure resistance relative to the pipe pressure resistance, a critical pressure cross-section of the at least one fourth critical cross-section of the couplings is configured to be as large as possible relative to the first critical cross-section of the pipe body within constraints of: (i) a wall thickness of the pipe body between the first outer diameter and the first inner diameter and (ii) the fourth outer diameter of the couplings within a predetermined annular clearance inside a surrounding wall.

6. The casing assembly of claim 1, wherein to maximize the connection tension resistance relative to the pipe tension resistance, a ratio of a critical tension cross-section of the at least one fourth critical cross-section of the couplings is maximized relative to the first critical cross-section of the pipe body within constraints of: (i) a wall thickness of the pipe body between the first outer diameter and the first inner diameter and (ii) the fourth outer diameter of the couplings within a predetermined predefined annular clearance inside a surrounding wall.

7. A casing string for use with a predetermined annular clearance inside a surrounding wall, the casing string comprising:
    tubulars each having a pipe body and pin ends, the pipe body having a first outer diameter and having a bore with a first inner diameter, the pipe body having a first critical cross-section defined by the first outer diameter and the first inner diameter, a first strength of the pipe body being defined by the first critical cross-section, the pipe body having a pipe tension resistance and having a pipe pressure resistance defined by the first strength, the first inner diameter being a first constraint dictated by the predetermined annular clearance, the first outer diameter being a second constraint dictated by the predetermined annular clearance, each of the pin ends having a turn-down recessed to a second outer diameter smaller than the first outer diameter, the turn-down having a second critical cross-section defined by the second outer diameter and the first inner diameter, a second strength of the turn-down being defined by the second critical cross-section, each of the pin ends tapering inward from the second outer diameter at the turn-down to a third outer diameter at a pin nose of the pin end, the pin end having a third critical cross-section defined by the third outer diameter and the first inner diameter, a third strength of the pin end being defined by the third critical cross-section, each of the pin ends having a pin thread formed externally on a portion thereof; and couplings each having a cylindrical body, the cylindrical body having opposing ends and having a through-bore, the cylindrical body having a fourth outer diameter, the through-bore having a second inner diameter, the fourth outer diameter being greater than the first outer diameter of the pipe body and being a third constraint dictated by the predetermined annular clearance to the surrounding wall, the through-bore having first and second portions of box thread formed internally thereon, the second inner diameter at the first portion tapering outward from a center of the through-bore to one of the opposing ends, the second inner diameter at the second portion tapering outward from the center of the through-bore to the other of the opposing ends, the couplings each having at least one fourth critical cross-section defined by the fourth outer diameter and the second inner diameter, a fourth strength of the coupling being defined by the at least one fourth critical cross-section, the pin threads of opposing ones of the pin ends being configured to thread respectively in a connection to the first and second portions of the box thread of the couplings, the pin noses of the opposing ones of the pin ends being configured to meet in the connection in the center of the couplings and are configured to engage with a contact pressure against one another, wherein (a) at least the second critical cross-section of the turn-down is selected within the first, second, and third constraints to increase the at least one fourth critical cross-section of the coupling relative to the first critical cross-section of the pipe body, and (b) at least the third strength of the pin end defined by the third critical cross-section of the pin end is iteratively selected relative to the fourth strength of the coupling defined by the at least one fourth critical cross-section of the coupling within the first, second, and third constraints to achieve: a connection tension resistance at a first targeted level that is at least 70 percent of the pipe tension resistance of the pipe body, and a connection pressure resistance for the connection at a second targeted level to that is at least 70 percent of the pipe pressure resistance of the pipe body.

8. The casing string of claim 7, wherein the pin thread and the box thread comprise interference fit thread being configured for the connection tension resistance and the connection pressure resistance.

9. A method of manufacturing a casing assembly with tubulars and a coupling for use with a predetermined annular clearance inside a surrounding wall, the method comprising:

selecting a first outer diameter and a weight of a pipe body for the tubulars, the pipe body having a first critical cross-section defined by the first outer diameter and a first inner diameter, a first strength of the pipe body being defined by the first critical cross-section, the pipe body having a pipe tension resistance and a pipe pressure resistance defined by the first strength;

selecting a fourth outer diameter of the coupling to fit within the predetermined annular clearance, the coupling having at least one fourth critical cross-section defined by the fourth outer diameter and a second inner diameter; and configuring a connection at box ends of the coupling to pin ends of the tubulars by:
(i) forming a turn-down in the first outer diameter of the pipe body at each of the pin ends of the tubulars, the turn-down recessed to a second outer diameter smaller than the first outer diameter, the turn-down having a second critical cross-section defined by the second outer diameter and the first inner diameter, a second strength of the turn-down being defined by the second critical cross-section;
(ii) configuring pin thread of opposing ones of the pin ends to thread respectively to box thread in the box ends of the coupling, the pin end having a third critical cross-section defined by a third outer diameter and the first inner diameter, a third strength of the pin end being defined by the third critical cross-section;
(iii) configuring nose bearing area of pin noses on the opposing ones of the pin ends to contact with one another in a center of a through-bore of the coupling; and
(iv) selecting at least the second critical cross-section of the turn-down to increase the at least one fourth critical cross-section of the coupling relative to the first critical cross-section of the pipe body and iteratively selecting at least the third strength of the pin end defined by the third critical cross-section of the pin end relative to a fourth strength of the coupling defined by the at least one fourth critical cross-section of the coupling to achieve: a connection tension resistance for the connection at a first targeted level to that is at least 70 percent of the pipe tension resistance of the pipe body, and a connection pressure resistance for the connection at a second targeted level that is at least 70 percent of the pipe pressure resistance of the pipe body.

10. The method of claim 9, wherein configuring the pin thread to thread to the box thread and configuring the pin noses to contact comprises:

forming the pin thread externally on each of the pin ends tapering inward from the second outer diameter at the turn-down to the third outer diameter at the pin nose of each of the pin ends, and forming first and second sections of the box thread internally on the through-bore of the coupling and tapering from a center of the through-bore to opposing ends of the coupling.

11. The method of claim 9, wherein configuring the pin thread to thread to the box thread comprises forming interference fit threads configured for the connection tension resistance and the connection pressure resistance.

12. The method of claim 11, wherein configuring the connection further comprises reducing and smoothing hoop stresses, axial hoop stress distribution, and displacements of the pin ends of the tubulars and the box ends of the coupling.

13. The method of claim 9, wherein configuring the connection comprises configuring the connection pressure resistance to meet a rating for pressure alone by balancing a critical pressure cross-section of the at least one fourth critical cross-section of the coupling to be as large as possible relative to the first critical cross-section of the pipe body within constraints of: (i) a wall thickness of the pipe body and (ii) the fourth outer diameter of the coupling.

14. The method of claim 9, wherein configuring the connection comprises configuring the connection tension resistance to meet a rating for tension alone by maximizing a ratio of a critical tension cross-section of the at least one fourth critical cross-section of the coupling relative to the first critical cross-section of the pipe body within constraints of: (i) a wall thickness of the pipe body and (ii) the fourth outer diameter of the coupling.

* * * * *